No. 718,989. PATENTED JAN. 27, 1903.
R. T. DRESSLER.
HEATING FURNACE.
APPLICATION FILED MAY 6, 1902.

NO MODEL. 2 SHEETS—SHEET 1.

Witnesses
R. T. Dressler, Inventor.
by C. A. Snow & Co.
Attorneys

No. 718,989. PATENTED JAN. 27, 1903.
R. T. DRESSLER.
HEATING FURNACE.
APPLICATION FILED MAY 6, 1902.
NO MODEL. 2 SHEETS—SHEET 2.

Witnesses
R. T. Dressler, Inventor
by C. A. Snow & Co.
Attorneys

UNITED STATES PATENT OFFICE.

ROBERT T. DRESSLER, OF HASTINGS, NEBRASKA.

HEATING-FURNACE.

SPECIFICATION forming part of Letters Patent No. 718,989, dated January 27, 1903.

Application filed May 6, 1902. Serial No. 106,219. (No model.)

*To all whom it may concern:*

Be it known that I, ROBERT T. DRESSLER, a citizen of the United States, residing at Hastings, in the county of Adams and State of Nebraska, have invented a new and useful Heating-Furnace, of which the following is a specification.

My invention is an improved heating-furnace; and it consists in the peculiar construction and combination of devices hereinafter fully set forth and claimed.

Figure 1:
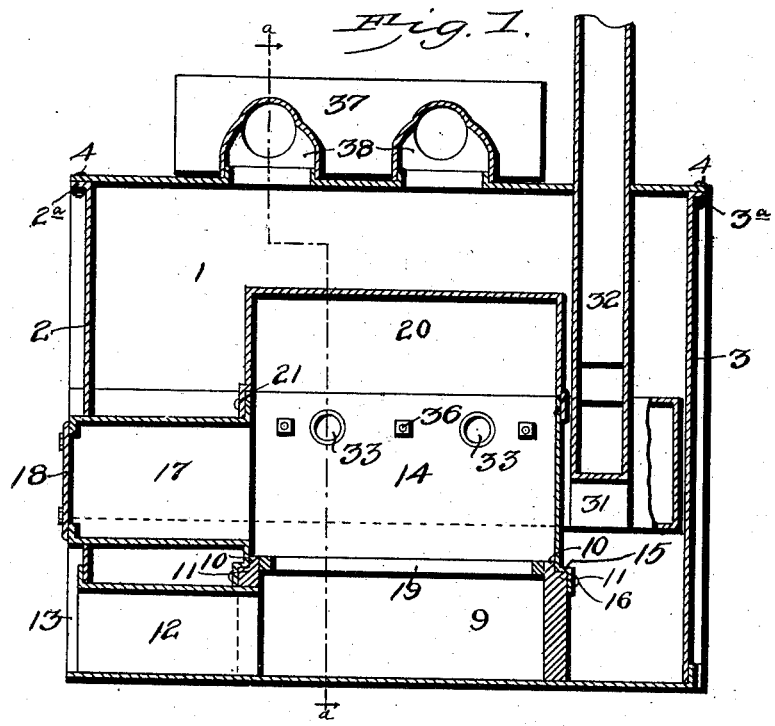
Figure 2:
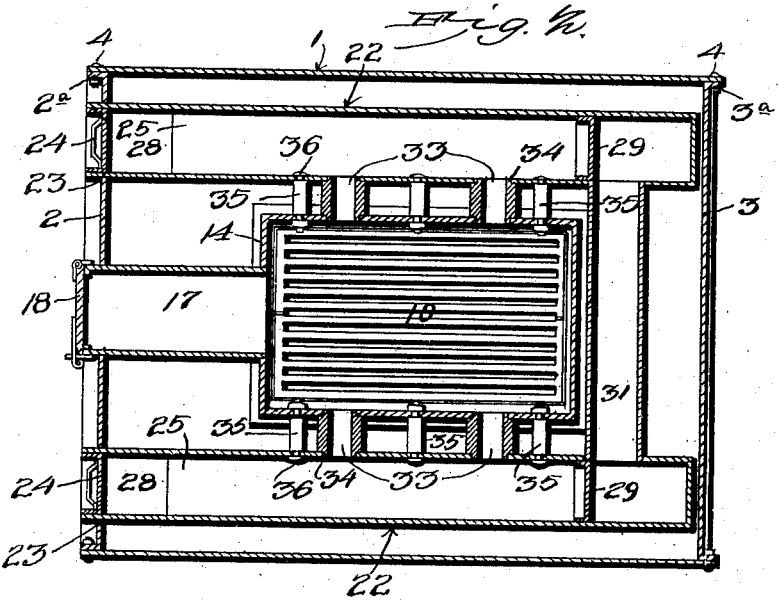
Figure 3:
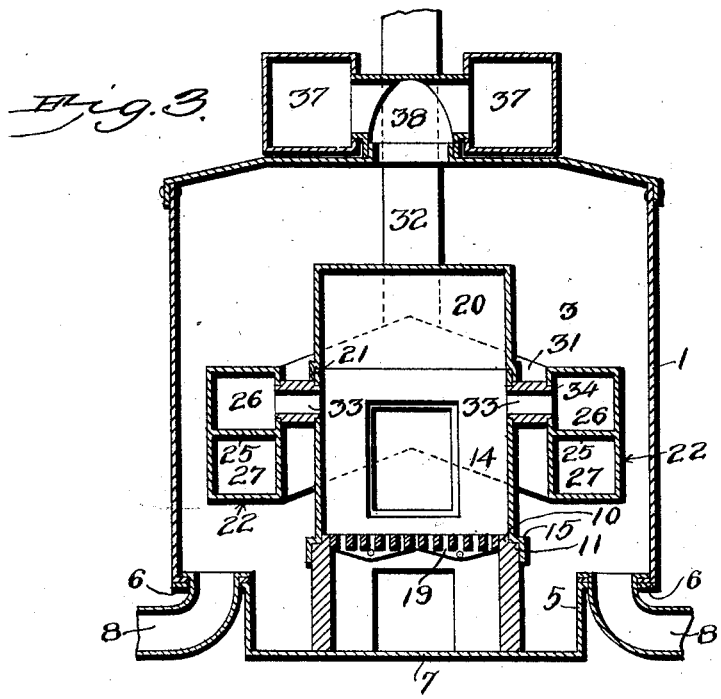
Figure 4:
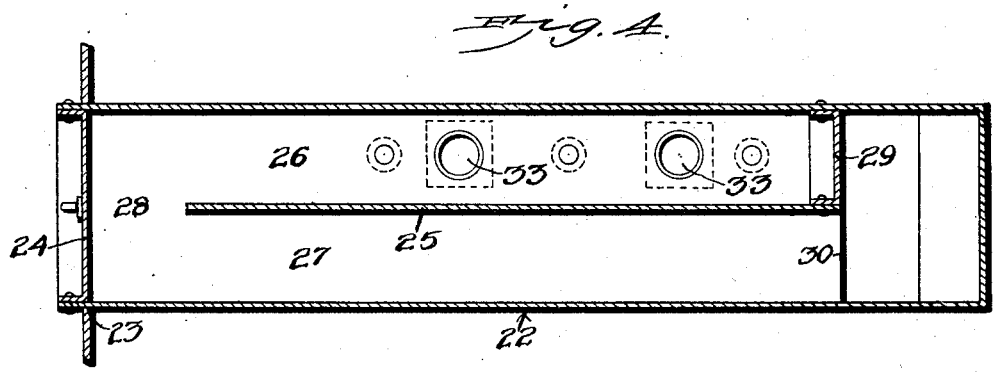

In the accompanying drawings, Figure 1 is a vertical longitudinal central sectional view of a heating-furnace constructed in accordance with my invention. Fig. 2 is a horizontal sectional view of the same. Fig. 3 is a vertical transverse sectional view of the same, taken on a plane indicated by the line $a\ a$ of Fig. 1. Fig. 4 is a detail longitudinal sectional view of one of the radiating-flues.

In the embodiment of my invention I provide an outer casing 1, provided with a removable front 2. The front and rear walls 2 3 of the outer casing are provided with flanges $2^a\ 3^a$, connected to the side walls of said casing by means of bolts 4. The outer casing is shown as formed with reëntrant inset shouldered portions 5, whereby certain portions 6 of the bottom are somewhat raised above the intermediate portion 7 thereof and adapted for connection therewith of cold-air-supply pipes 8.

The ash-pit 9 has a flange 10 and a shoulder 11 at its upper edge. A tubular neck 12 extends from the front side of the ash-pit to and through a draft-opening 13 in the front side of the outer casing, through which ashes may also be removed.

14 designates the fire-box, the lower edge of which is flanged, as at 15, to engage the flanged upper edge of the ash-pit, with which it may be connected by bolts 16. The fire-box has a fuel-duct 17, provided with a door 18. The grate 19 is supported in the upper portion of the ash-pit. On the upper side of the fire-box is secured a radiating-dome 20, the lower edges of which have flanges 21, overlapping the upper edges of the side and end walls of the fire-box. On opposite sides of the fire-box are longitudinally-disposed radiators 22 of tubular form and which are here shown as of rectangular form in cross-section. These radiators are preferably made of sheet or plate metal and are about coextensive in length with the outer casing in which they are disposed. The front ends of the said side radiators project through and fit snugly in openings 23 in the front 2 of the outer casing and are provided with suitable removable closures 24. Each of the said side radiators is provided with a central longitudinally-disposed baffle-plate 25, which forms an upper flue 26 and a lower flue 27 in each of said side radiators. Said flues of each radiator communicate at their outer end, as at 28. The inner end of the upper flue 26 is closed, as at 29, and the inner end of the lower flue 27 communicates, as at 30, with a laterally-disposed upwardly-inclined smoke-uptake 31, which discharges into a vertical smoke-escape pipe 32. The upper flue 26 of each side radiator is connected to one side of the fire-box by a plurality of lateral flues 33. Said lateral flues have their ends flanged, as at 34, to enter openings in the opposing sides of the fire-box and side radiators and to bear against the said opposing sides. Space-blocks 35 are interposed between the sides of the fire-box and the sides of the side radiators, and bolts 36, which extend through the opposing sides of the side radiators and the fire-box and also through the said space-blocks, firmly secure the said side radiators in place and firmly secure the flanged ends of the lateral flues 33 in the openings in the side radiators and fire-box. It will be understood that this construction and arrangement of devices enables the side radiators to be readily detached from the fire-box. It will be further understood that by removing the closures 24 access may be attained to the interiors of the side radiators to enable them to be cleaned and the soot which becomes deposited therein to be removed therefrom.

Radiating-drums 37 are shown on the upper side of the outer casing in Figs. 1 and 3 of the drawings, which radiating-drums communicate with the interior of the outer casing through hot-air connections 38.

It will be understood that the cold air which enters the lower portion of the outer casing through the pipes 8 is heated in the outer casing by radiation from the fire-box, dome 20, and side radiators 22, rises through the outer casing into the connections 38, and from the latter passes to the drums 37 or may be conveyed to registers at any other desired point.

My improved furnace is of simple construction, may be readily manufactured at slight cost, and possesses maximum heating efficiency.

Having thus described my invention, I claim—

In combination with a fire-box, side radiators, lateral flues connecting the same to the fire-box, said lateral flues having flanged ends, fitted in openings in the radiators and said fire-box, space-blocks interposed between the fire-box and side radiators, and bolts extending through said space-blocks and the opposing sides of the fire-box and radiators, substantially as described.

In testimony that I claim the foregoing as my own I have hereto affixed my signature in the presence of two witnesses.

ROBERT T. DRESSLER.

Witnesses:
JOHN T. POWERS,
WM. HAUBRECH.